United States Patent
Holz et al.

(10) Patent No.: US 11,710,892 B2
(45) Date of Patent: Jul. 25, 2023

(54) ELECTROMAGNETIC-RADIATION-REFLECTING STRUCTURE, ARTICLE OF CLOTHING HAVING AN ELECTROMAGNETIC-RADIATION-REFLECTING STRUCTURE, USE OF SUCH AN ELECTROMAGNETIC-RADIATION-REFLECTING STRUCTURE, AND SYSTEM FOR DETECTING A USER

(71) Applicant: Robert Bosch GmbH, Stuttgart (DE)

(72) Inventors: Rainer Holz, Marbach (DE); Uwe Wostradowski, Weil der Stadt-Merklingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 302 days.

(21) Appl. No.: 16/958,505

(22) PCT Filed: Dec. 20, 2018

(86) PCT No.: PCT/EP2018/086051
§ 371 (c)(1),
(2) Date: Jun. 26, 2020

(87) PCT Pub. No.: WO2019/137779
PCT Pub. Date: Jul. 18, 2019

(65) Prior Publication Data
US 2020/0350662 A1 Nov. 5, 2020

(30) Foreign Application Priority Data
Jan. 10, 2018 (DE) .......................... 102018200265.7

(51) Int. Cl.
*H01Q 15/16* (2006.01)
*H01Q 1/27* (2006.01)
*A41D 13/01* (2006.01)

(52) U.S. Cl.
CPC ............. *H01Q 1/273* (2013.01); *A41D 13/01* (2013.01)

(58) Field of Classification Search
CPC ...... A41D 13/01; A41D 13/018; A41D 1/002; H01Q 1/273; H01Q 15/14; H01Q 15/22;
(Continued)

(56) References Cited

U.S. PATENT DOCUMENTS

| | | | | |
|---|---|---|---|---|
| 9,423,635 | B1 * | 8/2016 | Cameron | A61B 5/14532 |
| 2003/0213045 | A1 * | 11/2003 | Fuentes | B60Q 1/2673 2/69 |

(Continued)

FOREIGN PATENT DOCUMENTS

| | | | | |
|---|---|---|---|---|
| DE | 102009021851 | * | 12/2009 | H01Q 1/273 |
| DE | 102009021851 A1 | * | 12/2009 | A41D 13/01 |

(Continued)

OTHER PUBLICATIONS

Bibliograhic Data English Translation for DE102009021851, Daimler AG (Year: 2009).*

(Continued)

*Primary Examiner* — Linh V Nguyen
(74) *Attorney, Agent, or Firm* — Norton Rose Fulbright US LLP; Gerard Messina

(57) ABSTRACT

An electromagnetic-radiation-reflecting structure that is attached at a location on a user's body. The electromagnetic-radiation-reflecting structure generating, as the user proceeds in usual fashion, a micro-Doppler effect as a result of its attachment at the location on the body so that a radar cross section of the user is increased, a material of the electromagnetic-radiation-reflecting structure having a conductivity greater than 100 S/m or a conductivity less than 100 S/m, a relative permeability between 100 and $10^5$, and a relative permittivity between 1 and 14; or has a conductivity less than 100 S/m, a relative permeability between 1 and 100, and a relative permittivity between 7 and 14; and a surface area of the electromagnetic-radiation-reflecting structure (120) is greater than 1000 mm$^2$.

16 Claims, 3 Drawing Sheets

(58) Field of Classification Search
CPC .......... G01S 3/931; G01S 13/88; G01S 13/04;
G01S 13/50; G01S 13/86; G01S 13/878;
G01S 13/91; G01S 13/93; G01S 13/931;
G01S 15/08; G01S 15/42; G01S 17/08;
G01S 17/58; G01S 2013/468; G01S
2013/9329; G01S 3/781; G01S 7/027;
G01S 7/292; G01S 7/41; G01S 7/415
USPC ................................ 343/897, 880, 761, 915
See application file for complete search history.

(56) References Cited

U.S. PATENT DOCUMENTS

| | | | |
|---|---|---|---|
| 2008/0089056 A1* | 4/2008 | Grosjean | F21V 33/0008 362/103 |
| 2011/0163903 A1* | 7/2011 | Bernhardt | G01S 7/36 342/1 |
| 2013/0185847 A1 | 7/2013 | Steenson et al. | |
| 2015/0029050 A1* | 1/2015 | Driscoll | H01Q 3/30 342/5 |
| 2017/0252256 A1* | 9/2017 | Henshue | E01C 5/20 |
| 2017/0263107 A1* | 9/2017 | Doyle | G08B 25/08 |
| 2018/0000184 A1* | 1/2018 | Jang | F21V 33/0008 |
| 2019/0183190 A1* | 6/2019 | Loberti | A41D 13/0015 |

FOREIGN PATENT DOCUMENTS

| | | |
|---|---|---|
| DE | 102009021851 A1 | 12/2009 |
| DE | 102011005567 A1 | 9/2012 |
| DE | 102016213254 B3 | 7/2017 |
| EP | 1294052 A1 | 3/2003 |
| GB | 2369248 A | 5/2002 |
| JP | 2004275699 A | 10/2004 |
| WO | 2009144595 A2 | 12/2009 |

OTHER PUBLICATIONS

International Search Report for PCT/EP2018/086051, dated Mar. 13, 2019.

* cited by examiner

ELECTROMAGNETIC-RADIATION-REFLECTING STRUCTURE, ARTICLE OF CLOTHING HAVING AN ELECTROMAGNETIC-RADIATION-REFLECTING STRUCTURE, USE OF SUCH AN ELECTROMAGNETIC-RADIATION-REFLECTING STRUCTURE, AND SYSTEM FOR DETECTING A USER

FIELD

The present invention relates to an electromagnetic-radiation-reflecting structure, to an article of clothing having such an electromagnetic-radiation-reflecting structure, to a use of such an electromagnetic-radiation-reflecting structure, and to a system for detecting a user.

BACKGROUND INFORMATION

Passenger cars that are equipped with an automotive radar, which is also referred to as a motor-vehicle radar or automobile radar, have become common in recent years. The automobile radar measures, from the vehicle's viewpoint, the respective distance and direction to other vehicles, to obstacles, or to other objects. The automobile radar furthermore assists the driver when changing lanes or when braking, in order to prevent accidents. The automobile radar is additionally used to warn the driver of hazards or to control devices or systems, for example safety belts or airbags, that are installed in the motor vehicle.

The European New Car Assessment Program (Euro-NCAP) is a group of European transport ministries, automobile clubs, and insurance associations which carries out crash tests on different automobile models, and evaluates the safety of the installed safety systems.

One aspect thereof is pedestrian protection, which aims to better protect pedestrians in the event of an accident. The risk of injury presented to pedestrians by the front portion is evaluated here. There are a number of different approaches with which effective pedestrian protection can be achieved.

These include, for example, engine compartment hoods that automatically lift up a few centimeters in the event of an accident, thereby offering more deformation space. Another technology is, for example, airbags for the front region, which are triggered upon impact with a pedestrian and open outward. A test has also recently become available for evaluating emergency braking assistants for pedestrian recognition.

One factor that substantially influences the extent of injury to a pedestrian in a collision is the vehicle's speed at the time of impact. An increasing number of vehicle manufacturers offer systems that are intended to considerably reduce the speed of the vehicle, or in the best case to bring the vehicle to a stop, before colliding with a pedestrian.

The aforementioned emergency braking assistants for pedestrian recognition can be implemented using either camera systems or radar systems. Automobile radar systems have become increasingly capable in recent years. Pedestrian recognition using radar is the subject of current research. A large problem here is that of distinguishing moving users from non-moving objects. In contrast to non-moving objects, the reflected radar-frequency spectra of pedestrians or bicyclists exhibit characteristic time-dependent Doppler shifts that derive from motions of the arms and hands. The effect associated therewith is referred to as a "micro-Doppler" effect, and the structures in the corresponding relative frequency distributions associated therewith are called micro-Doppler signatures or micro-Doppler components.

The mechanical vibrations or rotations of structures of a larger object recognizable in the radar are called "micro-motion."

When a radar unit emits an electromagnetic signal toward a target or object, the signal interacts with the target and returns to the radar unit. Changes in the properties of the returned signal reflect the properties of the target. If the target is moving, the frequency of the reflected signal is shifted because of the Doppler effect. The Doppler frequency shift can be used to determine the radial velocity of the moving target. If the target, or any structure on the target, is vibrating or rotating in addition to the translational motion of the target in a radial direction, this will produce a frequency modulation of the returned signal which generates side bands around the Doppler frequency of the target. This modulation is called a "micro-Doppler" effect. The micro-Doppler effect can be regarded as a characteristic of the interaction between the vibrating or rotating structure and the target body.

SUMMARY

In accordance with the present invention, an electromagnetic-radiation-reflecting structure reflects electromagnetic radiation incident onto it, and thereby increases a radar cross section of a user. A "user" can be understood here as a person or an animal, in particular a traffic participant such as pedestrians, bicyclists, or animals participating in traffic. "Traffic" can be understood as road traffic, rail traffic, logistics traffic (automated transport systems), or ship and air traffic. A "user" can also be understood as things or objects that can utilize such an electromagnetic-radiation-reflecting structure, for instance drones and robots in manufacturing.

In order to increase the user's radar cross section, it is necessary for the electromagnetic-radiation-reflecting structure to be attached to the user's body. The advantageous result of increasing the radar cross section is that the user can be more easily detected in the radar.

The radar cross section generally depends on many factors. An analytical determination of radar cross section is possible only for simple objects. The radar cross section depends on the object shape and on the ratio between the object's structural dimensions and the wavelength. The "radar cross section" of an object is defined as the cross-sectional area of a perfectly reflective sphere that would generate a reflection of the same intensity as the object in question. For objects whose dimensions are at least ten times greater than the wavelength, the radar cross section is frequency-independent. The corresponding region is called the "optical frequency-independent region." The present invention operates within that region.

The unit of radar cross section is the square meter. Typical radar cross section values are between $10^{-3}$ $m^2$ for insects and $10^6$ $m^2$ for large ships. Typical values for a centimeter-wave radar are listed below by way of example: insect: 0.00001 $m^2$; bird: 0.01 $m^2$; "stealth" aircraft: <0.1 $m^2$; anti-aircraft missile: ≈0.1 $m^2$; person: 1 $m^2$; small fighter aircraft: 2-3 $m^2$; large fighter aircraft: 5-6 $m^2$; transport aircraft: up to 100 $m^2$; corner reflector with 1.5-m edge length: ≈20,000 $m^2$; coaster ship (55 m long): 300-4000 $m^2$; frigate (103 m long): 5000-100,000 $m^2$; container ship (212 m long): 10,000-80,000 $m^2$.

Because of this wide range of radar cross section values, a logarithmic scale having a reference value $\sigma_{ref}=1\ m^2$ is often used, as follows:

$$\sigma_{dBsm} = \sigma_{dBm^2} = 10\ \log_{10}\left(\frac{\sigma_{m^2}}{\sigma_{ref}}\right) = 10\ \log_{10}\left(\frac{\sigma_{m^2}}{1m^2}\right).$$

A radar cross section of 1 m² thus corresponds to a value on the logarithmic scale of 0 dbSm=0 dBm², and a radar cross section of 0.01 m² corresponds to a value on the logarithmic scale of −20 dBm². A sphere 4 cm in diameter, for instance, has a radar cross section of 1.54 dBm².

A "radar" can be understood in particular as a radar unit installed in an automobile. The term "radar" can also be understood in the present case, however, as any other radar system, for instance radar systems used in rail traffic.

In accordance with the present invention, the electromagnetic-radiation-reflecting structure is attached at a location on the user's body such that the electromagnetic-radiation-reflecting structure generates, as the user proceeds in usual fashion, a micro-Doppler effect because of its attachment to the point on the body, so that a radar cross section of the user is increased. As has already been explained above, this is a location on the body that moves intensely, i.e., with a large amplitude, relative to a radar unit. The advantageous result of this feature is that the micro-Doppler effect of the electromagnetic-radiation-reflecting structure is particularly large, so that the user who is wearing an electromagnetic-radiation-reflecting structure on his or her body can be recognized more easily in the radar.

The reflectivity of the electromagnetic-radiation-reflecting structure must be greater than a predefined value. That predefined value must not be too low. The electromagnetic-radiation-reflecting structure should have a reflectivity such that the electromagnetic-radiation-reflecting structure can readily be recognized in the radar. This is the case in particular when the radar cross section of the electromagnetic-radiation-reflecting structure is larger than the radar cross section of a traffic participant or of an object moving in road traffic, for instance a car. This is also the case, however, when the electromagnetic-radiation-reflecting structure exhibits a greater micro-Doppler effect than other traffic participants or other objects moving in road traffic.

The reflectivity of a flat electromagnetic wave that strikes a flat interface is obtained from Fresnel's equations or formulas, which provide a correlation between a reflected and an incident electromagnetic wave at an interface, depending on the material properties. The first material at the interface is air, having a relative permittivity $\varepsilon_{r1}=\varepsilon_{rges1}=1$, and a permeability $\mu_{r1}=1$ and a conductivity $\kappa_1=0$. The second material at the interface has a relative permittivity $\varepsilon_2>1$, a permeability $\mu_{r2}\geq 1$, and a conductivity $\kappa_2\geq 0$ S. The complex relative total permittivity $\varepsilon_{rges2}$ is obtained as $$\varepsilon_{rges2} = \varepsilon_{r2} - j\cdot\frac{k_2}{\omega\varepsilon_0},$$

where $\omega=2\pi f$ is the angular frequency, f the frequency of the radar, and $\varepsilon_0$ the permittivity of the vacuum.

The complex expressions for reflectivity of the Fresnel equations are thus simplified to:

$$R_P = \frac{\varepsilon_{rges2} - \sqrt{\varepsilon_{rges2}\mu_{r2}}}{\varepsilon_{rges2} + \sqrt{\varepsilon_{rges2}\mu_{r2}}}$$

$$R_S = \frac{\mu_{r2} - \sqrt{\varepsilon_{rges2}\mu_{r2}}}{\mu_{r2} + \sqrt{\varepsilon_{rges2}\mu_{r2}}}$$

The reflection factors are equal to the ratio between the reflected and incident electric field vectors. $R_P$ here is the reflectivity if the polarization is parallel to the plane of incidence and reflection, and $R_S$ is the reflectivity if the polarization is perpendicular to the plane of incidence and reflection.

It is apparent from this that the reflectivity depends on the polarization plane of the radar and on the location of the reflecting shapes in the polarization plane. The radar backscatter cross section of one of the aforementioned exemplifying geometries can generally be determined only by numerical simulation using the correct material properties, or by measurement.

If the material of the electromagnetic-radiation-reflecting structure has a conductivity greater than 100 S/m, the relative permittivity and relative permeability can be selected without restriction, since the conductivity dominates the reflectivity as compared with the relative permittivity and relative permeability.

This is the case for a highly conductive reflector material of the electromagnetic-radiation-reflecting structure. In this case the material can preferably be copper or silver.

For the case in which the material of the electromagnetic-radiation-reflecting structure has a conductivity less than 100 S/m, i.e., in the case of low conductivity, the reflectivity of the material is dominated by the permittivity and/or permeability as compared with conductivity. In this case it is preferred that the material of the electromagnetic-radiation-reflecting structure be a paste or an ink.

For the case of a conductivity less than 100 S/m, two instances are distinguished:

If the relative permeability is between 100 and $10^5$, the relative permittivity is then between 1 and 14.

If the relative permeability is between 1 and 100, the relative permittivity is then between 7 and 14.

The surface area of the electromagnetic-radiation-reflecting structure is greater than 1000 mm².

According to a preferred embodiment of the present invention, the electromagnetic-radiation-reflecting structure has a surface filling ratio of between 80 and 100%, and the surface area of the electromagnetic-radiation-reflecting structure is greater than 2000 mm². The "surface filling ratio" is defined as the ratio between the surface area of the structure that is filled with material that reflects electromagnetic radiation, and the surface area of the electromagnetic-radiation-reflecting structure. The electromagnetic-radiation-reflecting structure preferably has a two-dimensional surface. In this case the surface area of the electromagnetic-radiation-reflecting structure is defined as the surface area of one of the two sides of the two-dimensional surface. This feature has the advantage that less material, as a percentage of the total area, is required for the electromagnetic-radiation-reflecting structure.

For surfaces having a surface filling ratio of 80% to 100%, the area for a structure having a radar cross section greater than 1 m² having one of the aforementioned material combinations must be increased at most by a factor of two in order to compensate for the material properties.

According to a further preferred embodiment of the present invention, the electromagnetic-radiation-reflecting structure has a surface filling ratio of between 40 and 80%, and the surface area of the electromagnetic-radiation-reflecting structure is greater than 4000 mm². This feature has the advantage that less material, as a percentage of the total area, is required for the electromagnetic-radiation-reflecting structure.

In terms of compensating for the surface filling factor in the range from close to 0% to 80%, for each halving of the surface filling factor the area must be doubled in order to again achieve a radar cross section of more than 1 m².

According to another further preferred embodiment of the present invention, the electromagnetic-radiation-reflecting structure has a surface filling ratio below 100%, and a minimum distance between conductive parts of the electromagnetic-radiation-reflecting structure is less than 1.95 mm. This feature has the advantage that substantially less material can be used but the maximum, or a very high, reflectivity can nevertheless be obtained.

The value of 1.95 mm corresponds to half the wavelength of the radar radiation used for a frequency of 76.5 GHz. A physical explanation of this is that if the structure has an opening that is smaller than half the wavelength, electromagnetic radiation cannot pass through the openings and is thus reflected.

According to a preferred embodiment of the present invention, a radar cross section of the electromagnetic-radiation-reflecting structure is greater than or equal to 0 dBm². The radar cross section of the electromagnetic-radiation-reflecting structure is preferably greater than or equal to 0.5 dBm², particularly preferably greater than or equal to 1 dBm². As a rule, a radar cross section of a user fluctuates greatly over time and as a function of angular position, and is between 0.1 and 1 dBm². The radar cross section of the electromagnetic-radiation-reflecting structure is preferably greater than a maximum radar cross section of a user. The advantageous result of this feature is that the radar cross section of a user who is wearing an electromagnetic-radiation-reflecting structure on his or her body is at least doubled, the consequence of which can be that he or she can be recognized more easily, in particular earlier and more reliably, in the radar.

The increase in the radar cross section is accomplished by increasing at least one micro-Doppler component. The advantageous result of increasing at least one micro-Doppler component is that a user who is proceeding in ordinary fashion in road traffic can be recognized more easily in the radar signal. This is because the micro-Doppler signatures have been increased.

Preferably at least one micro-Doppler signature is greater than a corresponding signal background that can be generated, inter alia, by micro-Doppler signatures of other objects. The at least one micro-Doppler signature can thereby advantageously be distinguished from the signal background.

The micro-Doppler effect is preferably more than 70% of the maximum micro-Doppler effect on the user's body. The maximum micro-Doppler effect on the user's body is at the location that is moving with the greatest amplitude when considered relative to the radar unit. The advantageous result achieved with this feature is that the micro-Doppler component is particularly greatly increased. This in turn has the effect of making the user easier to classify in the radar signal.

According to an example embodiment of the present invention, the location on the user's body at which the electrical structure is attached is on an arm or on a leg. That location is preferably in the vicinity of a hand or a foot. Users who are proceeding in ordinary fashion in road traffic generally exhibit relatively large velocity deviations from the average velocity as a result of foot motions and/or arm motions. Pedestrians as a rule exhibit larger arm motions than bicyclists. The micro-Doppler effect is advantageously increased by attaching the electromagnetic-radiation-reflecting structure to an arm or a foot.

According to an example embodiment of the present invention, the electromagnetic-radiation-reflecting structure is periodic along at least one dimension. This has the advantage that the electromagnetic-radiation-reflecting structure can be better recognized in the reflected radar signal, since the reflected and superimposed power level of all the basic elements of a periodic structure is greater than with a non-periodic structure. Particularly preferably, the period of the electromagnetic-radiation-reflecting structure is half the average free-space wavelength of the radar. The frequency of the radar is preferably between 76 and 81 GHz, particular preferably between 76 and 77 GHz. At a frequency of 76.5 GHz, the average free-space wavelength is 3.9 mm.

The electromagnetic-radiation-reflecting structure is preferably periodic along two dimensions. This has the advantage that detectability in the radar signal is further enhanced, and the electromagnetic-radiation-reflecting structure can be detected by radar units from any spatial direction. The electromagnetic-radiation-reflecting structure can furthermore be detected over the entire motion sequence regardless of the direction of motion.

An electromagnetic-radiation-reflecting structure having a periodic structure can preferably be, for instance, a frequency-selective surface or a metamaterial such as a DNM, AMC, etc. A "frequency-selective surface" (FSS) is understood as a surface that reflects electromagnetic radiation, in particular in the radio-frequency region up to several GHz, in frequency-dependent fashion. FSS coatings can block out individual frequencies, for instance in order to suppress interference due to a strong transmitter, without simultaneously preventing reception of all transmitters. A tunable radar, for instance, can distinguish flying objects on the basis of the FSS reflection pattern. The abbreviation DNM stands for "double negative metamaterials," which are also known as "negative-index metamaterials" (NIMs). In a DNM, both the dielectric constant and the magnetic permeability are negative, which results in a negative refractive index with counterintuitive consequences, for example perfect lenses or "invisibility cloaks."

The electromagnetic-radiation-reflecting structure is generally three-dimensional. The electromagnetic-radiation-reflecting structure is preferably two-dimensional. The basic topological dimension aspect here is one according to which the surface of a sphere is two-dimensional. A two-dimensional electromagnetic-radiation-reflecting structure of this kind can thus be flat or planar, but can also be in the form of a sleeve. A two-dimensional electromagnetic-radiation-reflecting structure has the advantage that the electromagnetic-radiation-reflecting structure can readily be integrated into or fastened onto a fabric, a textile, or an article of clothing, since the latter are also two-dimensional.

The electromagnetic-radiation-reflecting structure is preferably stamped, molded, stitched, and/or printed onto a surface of a fabric or of an article of clothing. These manufacturing methods are common and can therefore be carried out economically.

According to a further embodiment, the electromagnetic-radiation-reflecting structure is attached to or integrated into a fabric. This has the advantage that the fabric can be more effectively recognized on the radar than an ordinary fabric, while at the same time the fabric structure is modified only very little or not at all.

According another further embodiment of the present invention, the electromagnetic-radiation-reflecting structure is a fabric. This has the advantage that the fabric itself reflects the electromagnetic radiation. In this case the electromagnetic-radiation-reflecting structure does not first need to be integrated into a fabric or an article of clothing, but instead is already itself a fabric.

In this case the fibers or the constituents of the fabric itself are an electromagnetic-radiation-reflecting structure.

The fabric is preferably part of a textile or of an article of clothing. This has the advantage that the textile or article of clothing can be better recognized on the radar, and the same time the wearer of the textile or of the article of clothing will notice only minimal or indeed no changes to the textile or the article of clothing.

According to another example embodiment of the present invention, the fabric is attached or fastened on or onto a textile or on or onto an article of clothing. The advantages associated therewith have already been mentioned above.

The fabric or the structure preferably encompasses cotton, a plastic, a plastic coated with an electrically conductive coating, and/or a metal. The cotton, the plastic, the plastic coated with an electrically conductive coating, or the metal is preferably embodied as fibers or wires. A fabric having an electromagnetic-radiation-reflecting structure can advantageously be manufactured using this combination.

According to a further embodiment of the present invention, the structure or the fabric encompasses fibers, at least one fiber encompassing at least two materials from the list that consists of plastic, plastic coated with an electrically conductive coating, metal, and/or cotton.

According to another embodiment of the present invention, the electromagnetic-radiation-reflecting structure or the fabric comprises a metal or a plastic coated with an electrically conductive coating. These two materials can be part of the electromagnetic-radiation-reflecting structure.

According to a further embodiment of the present invention, the electromagnetic-radiation-reflecting structure has a transponder that is embodied and configured to reflect a signal. A transponder can be manufactured very inexpensively and with small dimensions.

The transponder is preferably a passive transponder. This has the advantage that the transponder does not require its own power source. The signal preferably encompasses at least one coded information item.

According to a further embodiment of the present invention, the transponder is embodied as an RFID label or as an RFID tag. RFID technology is standardized and common.

In accordance with an example embodiment of the present invention, the article of clothing has an electromagnetic-radiation-reflecting structure described above. The article of clothing has the advantage that it can be worn in just the same way as a normal article of clothing, but in addition can be recognized substantially better in the radar signal. When the article of clothing is worn by a user, an automobile radar can recognize the user substantially more effectively.

An "article of clothing" can be understood in the present case as a shirt, a pair of trousers, a headband, a cap, but also a shoe. In the case of a shoe, the electromagnetic-radiation-reflecting structure is preferably disposed in or on a textile part that covers the arch.

The electromagnetic-radiation-reflecting structure is suitable for use of an electromagnetic-radiation-reflecting structure at a location on a user's body that, as the user proceeds in usual fashion, generates a micro-Doppler effect as a result of its attachment at the location on the body, so that a radar cross section of the user is increased. This results in an increase in the user's radar cross section. A material of the electromagnetic-radiation-reflecting structure has a conductivity greater than 100 S/m or a conductivity less than 100 S/m, a relative permeability between 100 and 105, and a relative permittivity between 1 and 14, or a conductivity less than 100 S/m, a relative permeability between 1 and 100, and a relative permittivity between 7 and 14; and a surface area of the electromagnetic-radiation-reflecting structure is larger than 1000 mm$^2$.

In accordance with an example embodiment of the present invention, the system for detection of a user proceeding in usual fashion has a radar transceiver. The radar transceiver transmits and receives radar signals. The radar transceiver is embodied and configured in such a way that the radar transceiver can detect a change in a micro-Doppler component in a radar signal reflected from an electromagnetic-radiation-reflecting structure. The electromagnetic-radiation-reflecting structure serves to reflect a radar signal transmitted by the radar transceiver.

A system of this kind can be built into an automobile, where it can advantageously assist an emergency braking assistant by more easily detecting a user in road traffic.

The change in the micro-Doppler component is preferably an increase. This has the advantage that the change in the micro-Doppler component is more easily detectable.

Further advantages and embodiments of the present invention are evident from the description herein and from the figures.

It is understood that the features recited above and those yet to be explained below are usable not only in the respective combination indicated but also in other combinations or in isolation, without departing from the scope of the present invention.

BRIEF DESCRIPTION OF THE DRAWINGS

Exemplifying embodiments of the present invention are depicted in the figures and are explained in more detail in the description below.

DETAILED DESCRIPTION OF EXAMPLE EMBODIMENTS

Figure 1:
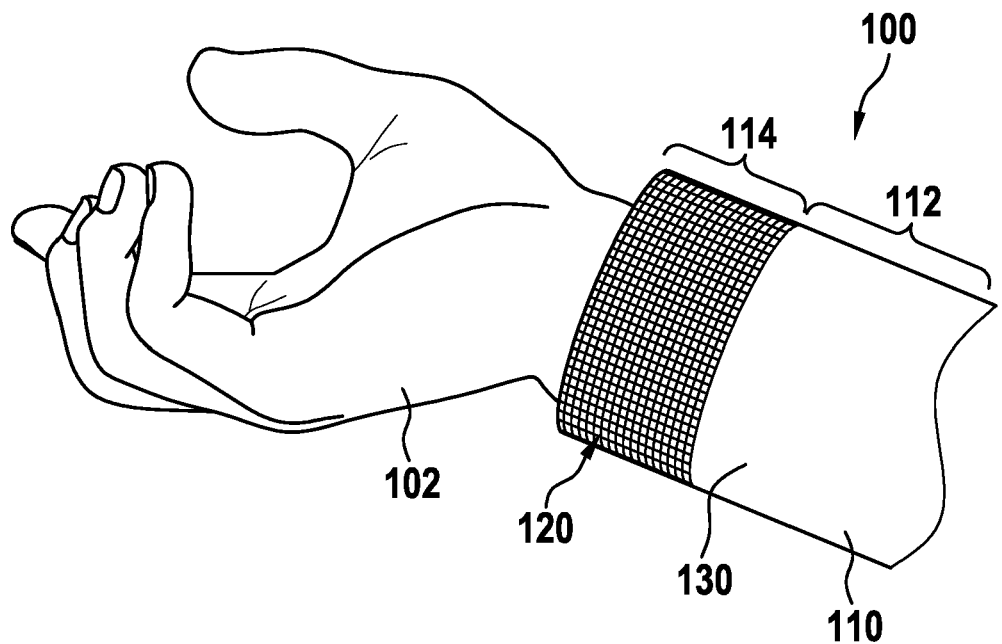
FIGS. 1, 2, and 3 each show an article of clothing having an electromagnetic-radiation-reflecting structure in accordance with a respective exemplifying embodiment of the present invention.

FIG. 1 shows an article of clothing 100 that is worn on the arm in the vicinity of a hand 102. Article of clothing 100 has a sleeve 110. In a first region 112, the sleeve has a usual fabric or usual textile 130 as is conventional. In a second region 114, the sleeve has an electromagnetic-radiation-reflecting structure 120 in the form of a wire mesh. The wire mesh is integrated into the usual textile. Second region 114 is closer to the end of sleeve 110 than first region 112 is. The wires have a diameter of 0.2 mm and are spaced one-half wavelength from one another. The radar cross section is equal to 5 dBm². The material of wires 122 is copper, which has a conductivity of 6.3·10⁷ S/m. Alternatively, silver or another very good conductor can be used.

Figure 2:
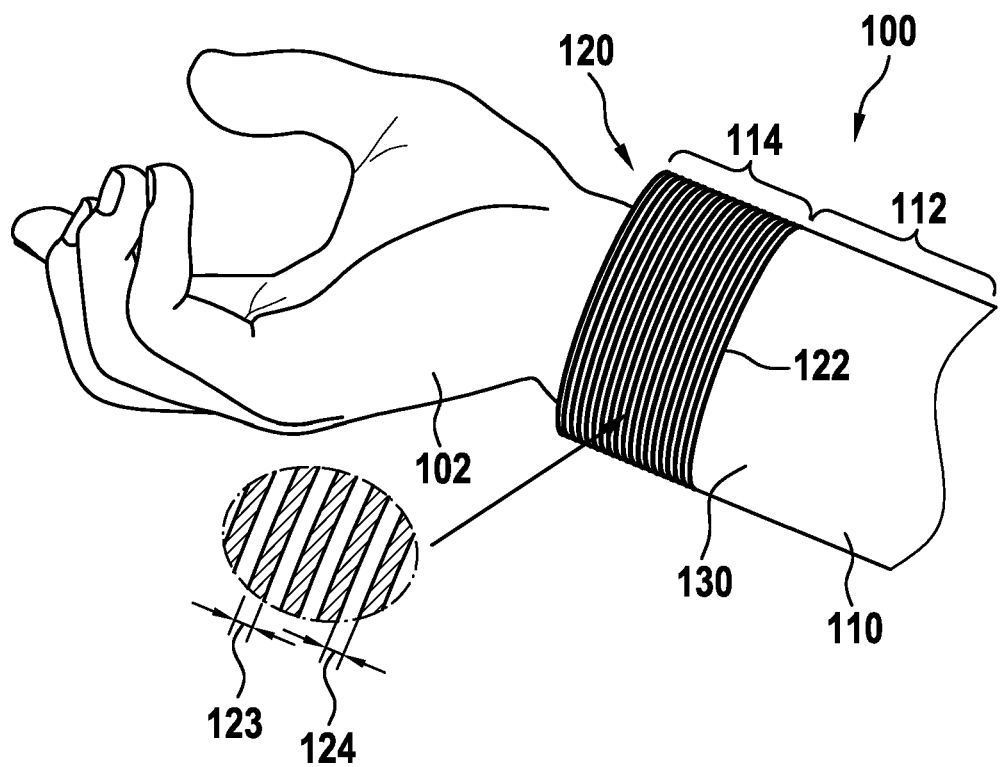

FIG. 2 shows an article of clothing 100 that is similar to article of clothing 100 that is shown in FIG. 1. Article of clothing 100 likewise has a sleeve 110 having a first region 112 and a second region 114. Second region 114 of sleeve 110 likewise has an electromagnetic-radiation-reflecting structure 120, but in contrast to the embodiment of FIG. 1 it has encircling wires 122 that do not touch one another. Wires 122 have a width 0.5 mm that is labeled with the reference character 123, and the mutual spacing of wires 122 is likewise 0.5 mm, labeled with the reference character 124. The circular diameter of second region 114 is 100 mm, so that the circumferential extent of one wire 122 is equal to $\pi$ times 100 mm, which is approximately 314 mm. This assemblage of wires 122 is integrated into a usual textile. Because only half the surface area of second region 144 is covered with a conductive structure, namely wires 122, and half is covered with a nonconductive structure, namely the usual textile, the surface filling ratio in this case is 50%. The material of wires 122 is copper, which has a conductivity of 6.3·10⁷ S/m. A mathematical simulation has indicated that the radar cross section of such a structure is greater than 0.8 dBm².

Figure 3:
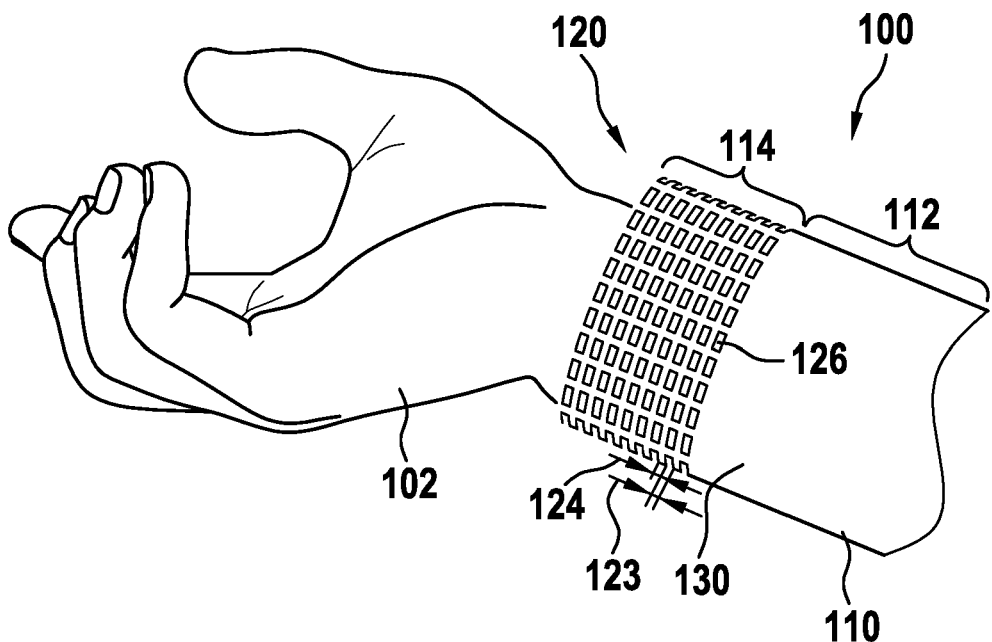

FIG. 3 shows an article of clothing 100 that is similar to article of clothing 100 that is shown in FIG. 1. Article of clothing 100 likewise has a sleeve 110 having a first region 112 and a second region 114. Second region 114 of sleeve 110 likewise has an electromagnetic-radiation-reflecting structure 120, but in contrast to the embodiments of FIG. 1 or 2 it has a plurality of conductor parts 126 that are not connected to one another and that cover 50% of the surface area of second region 114. The other 50% of the surface area of second region 114 encompasses a non-conductor, for instance a usual textile.

Conductor parts 126 have a width of 0.5 mm that is characterized by the reference character 123, and the spacing of conductor parts 126 along the direction of the arm is also 0.5 mm, this being indicated by the reference character 124.

Because conductor parts 126 are not continuous perpendicularly to the direction of the arm, the surface filling ratio in this case is less than 50% and is equal to 37.5%. The material of conductor parts 126 is copper. A mathematical simulation has indicated that the radar cross section of such a structure is greater than 0.1 dBm².

Figure 4:
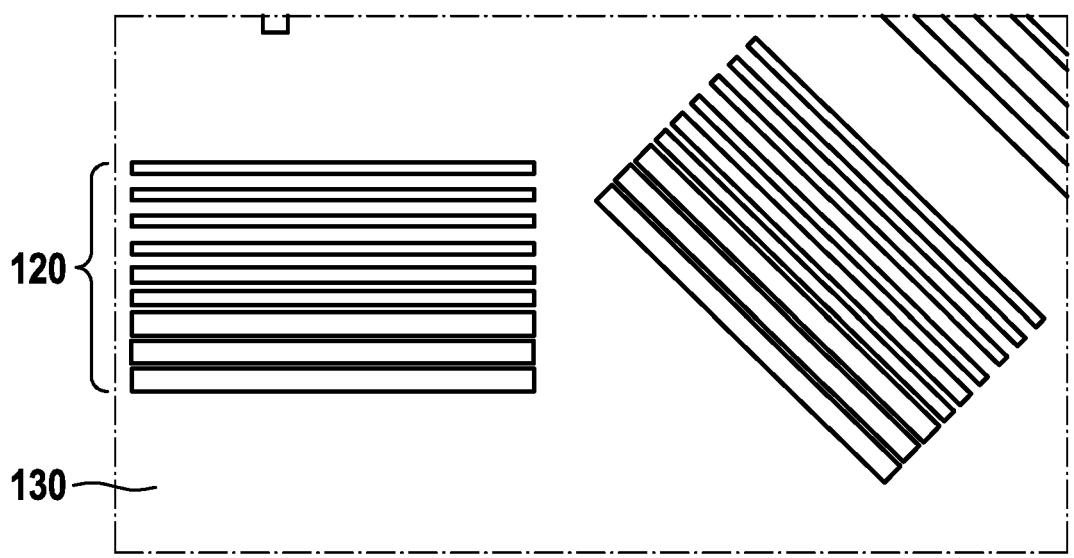
FIGS. 4, 5, and 6 show different embodiments with different manufacturing methods for a respective electromagnetic-radiation-reflecting structure or article of clothing in accordance with an exemplifying embodiment of the present invention.

FIG. 4 shows an electromagnetic-radiation-reflecting structure 120 that is printed onto a textile 130. Electromagnetic-radiation-reflecting structure 120 of FIG. 4 can be used in the embodiments of FIG. 1, 2, or 3 instead of electromagnetic-radiation-reflecting structure 120 illustrated therein.

Figure 5:
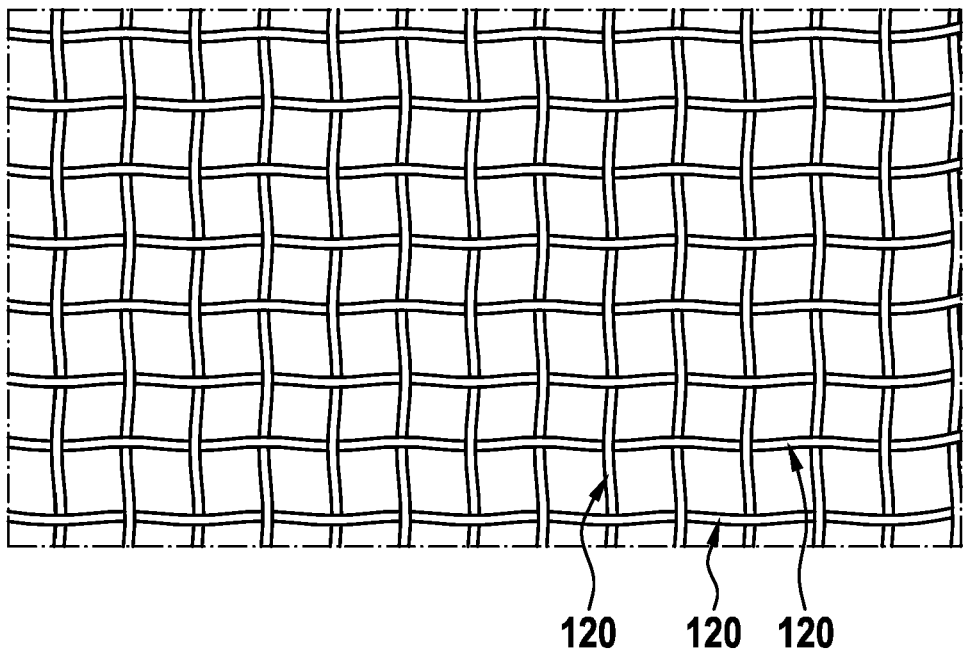

FIG. 5 shows an electromagnetic-radiation-reflecting structure 120 in the form of a metal mesh. The metal mesh is two-dimensional, and has the same spacing between adjacent metal wires along both of those dimensions. Electromagnetic-radiation-reflecting structure 120 of FIG. 5 can replace electromagnetic-radiation-reflecting structure 120 of FIG. 1, 2, or 3.

Figure 6:
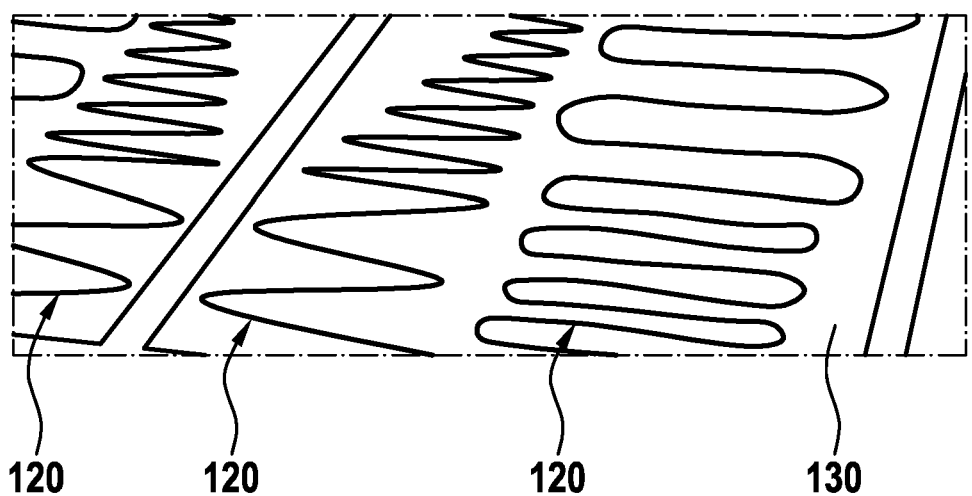

FIG. 6 shows an electromagnetic-radiation-reflecting structure 120 that is stitched in serpentine fashion onto a textile 130. Electromagnetic-radiation-reflecting structure 120 of FIG. 5 can replace electromagnetic-radiation-reflecting structure 120 of FIG. 1, 2, or 3.

What is claimed is:

1. An electromagnetic-radiation-reflecting structure that is attached at a location on a body of a user, the electromagnetic-radiation-reflecting structure configured to generate, as the user proceeds in usual fashion, a micro-Doppler effect as a result of the attachment at the location on the body so that a radar cross section of the user is increased;
    wherein a material of the electromagnetic-radiation-reflecting structure has:
        (i) a conductivity less than 100 S/m, a relative permeability between 100 and 10⁵, and a relative permittivity between 1 and 14, or
        (ii) a conductivity less than 100 S/m, a relative permeability between 1 and 100, and a relative permittivity between 7 and 14; and
    wherein a surface area of the electromagnetic-radiation-reflecting structure is greater than 1000 mm².

2. The electromagnetic-radiation-reflecting structure as recited in claim 1, wherein:
    the electromagnetic-radiation-reflecting structure has a surface filling ratio of between 80 and 100%; and
    the surface area of the electromagnetic-radiation-reflecting structure is greater than 2000 mm².

3. The electromagnetic-radiation-reflecting structure as recited in claim 1, wherein:
    the electromagnetic-radiation-reflecting structure has a surface filling ratio of between 40 and 80%; and
    the surface area of the electromagnetic-radiation-reflecting structure is greater than 4000 mm².

4. The electromagnetic-radiation-reflecting structure as recited in claim 1, wherein:
    the electromagnetic-radiation-reflecting structure has a surface filling ratio below 100%; and
    a minimum distance between conductive parts of the electromagnetic-radiation-reflecting structure is less than 1.95 mm.

5. The electromagnetic-radiation-reflecting structure as recited in claim 1, wherein a radar cross section of the electromagnetic-radiation-reflecting structure is greater than or equal to 1 dBm².

6. The electromagnetic-radiation-reflecting structure as recited in claim 1, wherein the location on the body of the user at which the electromagnetic-radiation-reflecting structure is attached is on an arm or on a leg.

7. The electromagnetic-radiation-reflecting structure as recited in claim 1, wherein the electromagnetic-radiation-reflecting structure is stamped, and/or molded, and/or stitched, and/or printed.

8. The electromagnetic-radiation-reflecting structure as recited in claim 1, wherein:
    (i) the electromagnetic-radiation-reflecting structure is attached to or integrated into a fabric; or
    (ii) the electromagnetic-radiation-reflecting structure is a fabric.

9. The electromagnetic-radiation-reflecting structure as recited in claim 8, wherein the fabric encompasses cotton, and/or plastic, and/or metal.

10. The electromagnetic-radiation-reflecting structure as recited in claim 1, further comprising:
    a transponder that is embodied and configured to reflect a signal.

11. The electromagnetic-radiation-reflecting structure as recited in claim 1, wherein the transponder is an RFID label or an RFID tag.

12. An article of clothing having an electromagnetic-radiation-reflecting structure, the electromagnetic-radiation-reflecting structure being configured to be situated at a location on a body of a user, the electromagnetic-radiation-reflecting structure configured to generate, as the user proceeds in usual fashion, a micro-Doppler effect as a result of the electromagnetic-radiation-reflecting structure being situated at the location on the body so that a radar cross section of the user is increased;
wherein a material of the electromagnetic-radiation-reflecting structure has:
(i) a conductivity less than 100 S/m, a relative permeability between 100 and $10^5$, and a relative permittivity between 1 and 14, or
(ii) a conductivity less than 100 S/m, a relative permeability between 1 and 100, and a relative permittivity between 7 and 14; and
wherein a surface area of the electromagnetic-radiation-reflecting structure is greater than 1000 mm$^2$.

13. A method, comprising:
attaching an electromagnetic-radiation-reflecting structure at a location on a body of a user that, as the user proceeds in usual fashion, generates a micro-Doppler effect as a result of its attachment at the location on the body, so that a radar cross section of the user is increased;
wherein a material of the electromagnetic-radiation-reflecting structure has:
(i) a conductivity less than 100 S/m, a relative permeability between 100 and $10^5$, and a relative permittivity between 1 and 14, or
(ii) a conductivity less than 100 S/m, a relative permeability between 1 and 100, and a relative permittivity between 7 and 14; and
wherein a surface area of the electromagnetic-radiation-reflecting structure is greater than 1000 mm$^2$.

14. A system for detection of a user who is proceeding in usual fashion, the system comprising:
a radar transceiver configured to transmit and receive radar signals, the radar transceiver being embodied and configured in such a way that the radar transceiver can detect a change in a micro-Doppler component in a radar signal reflected from an electromagnetic-radiation-reflecting structure;
wherein the electromagnetic-radiation-reflecting structure is an electromagnetic-radiation-reflecting structure attached at a location on a body of the user, the electromagnetic-radiation-reflecting structure configured to generate, as the user proceeds in the usual fashion, the micro-Doppler effect as a result of the attachment at the location on the body so that a radar cross section of the user is increased;
wherein a material of the electromagnetic-radiation-reflecting structure has:
(i) a conductivity less than 100 S/m, a relative permeability between 100 and $10^5$, and a relative permittivity between 1 and 14, or
(ii) a conductivity less than 100 S/m, a relative permeability between 1 and 100, and a relative permittivity between 7 and 14; and
wherein a surface area of the electromagnetic-radiation-reflecting structure is greater than 1000 mm$^2$.

15. The electromagnetic-radiation-reflecting structure as recited in claim 1, wherein the material of the electromagnetic-radiation-reflecting structure has a conductivity less than 100 S/m, a relative permeability between 100 and $10^5$, and a relative permittivity between 1 and 14.

16. The electromagnetic-radiation-reflecting structure as recited in claim 1, wherein the material of the electromagnetic-radiation-reflecting structure has a conductivity less than 100 S/m, a relative permeability between 1 and 100, and a relative permittivity between 7 and 14.

* * * * *